United States Patent
Chandra

(10) Patent No.: US 7,203,920 B2
(45) Date of Patent: Apr. 10, 2007

(54) METHOD AND APPARATUS FOR RETROFITTING SEMICONDUCTOR CHIP PERFORMANCE ANALYSIS TOOLS WITH FULL-CHIP THERMAL ANALYSIS CAPABILITIES

(75) Inventor: Rajit Chandra, Cupertino, CA (US)

(73) Assignee: Gradient Design Automation Inc., Santa Clara, CA (US)

( * ) Notice: Subject to any disclaimer, the term of this patent is extended or adjusted under 35 U.S.C. 154(b) by 49 days.

(21) Appl. No.: 11/039,737

(22) Filed: Jan. 20, 2005

(65) Prior Publication Data

US 2005/0166168 A1 Jul. 28, 2005

Related U.S. Application Data

(63) Continuation-in-part of application No. 10/979,957, filed on Nov. 3, 2004.

(60) Provisional application No. 60/599,098, filed on Aug. 5, 2004, provisional application No. 60/539,727, filed on Jan. 28, 2004.

(51) Int. Cl.
 *G06F 17/50* (2006.01)
(52) U.S. Cl. .............................. 716/6; 716/4
(58) Field of Classification Search ................. 716/4–6
 See application file for complete search history.

(56) References Cited

U.S. PATENT DOCUMENTS

| | | | | |
|---|---|---|---|---|
| 6,389,582 | B1 * | 5/2002 | Valainis et al. ................. | 716/9 |
| 6,591,399 | B1 * | 7/2003 | Wyrzykowska et al. ....... | 716/1 |
| 7,025,280 | B2 * | 4/2006 | Kaushal et al. ............... | 236/16 |
| 7,039,888 | B2 * | 5/2006 | Steinmann et al. ............ | 716/5 |
| 2005/0155004 | A1 * | 7/2005 | Miura et al. ................... | 716/4 |

OTHER PUBLICATIONS

Wang, Ting-Yuan, et al., "Thermal-ADI-A Linear-Time Chip-Level Dynamic Thermal-Simulation Algorithm Based on Alternating-Direction-Implicit (ADI) Method", IEEE Transactions on Very Large Scale Integration (VLSI) Systems, vol. 11, No. 4, dated Aug. 4, 2003, pp. 691-700.
Wang, Ting-Yuan, et al., "3D Thermal-ADI- An Efficient Chip-Level Transient Thermal Simulator", ISPD'03, Apr, 6-9, 2003, Monterey, California, USA http://www.ece.wisc.edu/~vlsi/research/ISPD2003_p005-wang.pdf, Copy consists of "8" unnumbered pages.
Wang, Ting-Yuan, et al., "3-D Thermal-ADI: A linear-Time Chip Level Transient Thermal Simulator", IEEE Transactions on Computer-Aided Design of Integrated Circuits and Systems, vol. 21, No. 12, dated Dec. 2002, pp. 1434-1445.
Wang, Ting-Yuan, et al., "Thermal-ADI: A Linear-Time Chip-Level Dynamic Thermal Simulation Algorithm Based on Alternating-Direction-Implicit (ADI) Method", ISPD'01, Apr. 1-4, 2001, Sonoma, California, USA http://www.ece.wisc.edu/~vlsi/research/ISPD2001_wang.pdf, Copy consists of "6" unnumbered pages.

* cited by examiner

*Primary Examiner*—Thuan Do
*Assistant Examiner*—Binh Tat
(74) *Attorney, Agent, or Firm*—Kin-Wah Tong, Esq.; Patterson & Sheridan, LLP

(57) ABSTRACT

A method and apparatus for retrofitting semiconductor chip performance analysis tools with full-chip thermal analysis capabilities is provided. One embodiment of a novel method for performing performance analysis of a semiconductor chip design includes receiving at least one input calculated in accordance with an actual (e.g., purposefully calculated rather than assumed or estimated) temperature of a semiconductor device and/or an interconnects in the semiconductor ship design. This input is then used to assess at least one temperature-dependent performance parameter of the semiconductor chip design.

16 Claims, 8 Drawing Sheets

METHOD AND APPARATUS FOR RETROFITTING SEMICONDUCTOR CHIP PERFORMANCE ANALYSIS TOOLS WITH FULL-CHIP THERMAL ANALYSIS CAPABILITIES

CROSS REFERENCE TO RELATED APPLICATIONS

This application claims the benefit of U.S. Provisional Patent Application No. 60/599,098, filed Aug. 5, 2004 (entitled "Method And Apparatus For Retrofitting Commercial Timing, Delay, Voltage And Power Analysis Tools With Temperature Gradients"), which is herein incorporated by reference in its entirety. This application is also a continuation-in-part of U.S. patent application Ser. No. 10/979,957, filed Nov. 3, 2004 (entitled "Method And Apparatus For Full-Chip Analysis Of Semiconductor Chip Designs") and claiming priority to U.S. Provisional Patent Application No. 60/539,727, filed Jan. 28, 2004 (entitled "Method and Apparatus for Improving Constant Temperature Based Timing Analysis of Integrated Circuits By Using Computed Thermal Gradients"), both of which are herein incorporated by reference in their entireties.

FIELD OF THE INVENTION

The present invention generally relates to semiconductor chip design, and more particularly relates to the performance analysis of semiconductor chip designs.

BACKGROUND OF THE INVENTION

FIG. 1 is a schematic diagram illustrating an exemplary semiconductor chip 100. As illustrated, the semiconductor chip 100 comprises one or more semiconductor devices 102a–102n (hereinafter collectively referred to as "semiconductor devices 102"), such as transistors, resistors, capacitors, diodes and the like deposited upon a substrate 104 and coupled via a plurality of wires or interconnects 106a–106n (hereinafter collectively referred to as "interconnects 106"). These semiconductor devices 102 and interconnects 106 share power, thereby distributing a thermal gradient over the chip 100 that may range from 100 to 180 degrees Celsius in various regions of the chip 100.

Semiconductor chips such as the semiconductor chip 100 typically comprise the bulk of the components in an electronic system. As such, proper performance analysis is critical to the design of semiconductor chips e.g., to ensure that a chip constructed in accordance with a given design will operate as intended and will not fail in use or waste materials. Performance analysis generally refers to the analysis of a plurality of semiconductor chip performance parameters, including timing, delay, voltage drops, current flow and power consumption. These parameters relate to the individual semiconductor devices and interconnects and are influenced by the local temperatures of the semiconductor devices and the interconnects, which vary throughout the semiconductor chip. Accordingly, a performance analysis tool requires accurate temperature data for these semiconductor devices and interconnects in order to reliably assess the expected performance of the semiconductor chip design.

Despite this, conventional performance analysis tools assume a single, uniform temperature throughout the semiconductor chip. For example, a conventional performance analysis may assume that a uniform temperature of ninety degrees Celsius exists over the semiconductor chip design, which would result in a delay of approximately twenty picoseconds for a specific gate in the design. However, while the temperatures of some of the semiconductor devices and interconnects on the semiconductor chip may actually be at about ninety degrees Celsius, the actual temperature for that specific gate may be much different than the assumed temperature (e.g., 120 degrees Celsius), resulting a different delay than that calculated based on the uniform temperature assumption. Consequently, performance analysis results based on this assumption may lead to under- or over-estimation of semiconductor chip performance, resulting in a semiconductor chip that does not perform as intended.

Therefore, there is a need in the art for a method and apparatus for retrofitting semiconductor chip performance analysis tools with full-chip thermal analysis capabilities.

SUMMARY OF THE INVENTION

A method and apparatus for retrofitting semiconductor chip performance analysis tools with full-chip thermal analysis capabilities is provided. One embodiment of a novel method for performing performance analysis of a semiconductor chip design includes receiving at least one input calculated in accordance with an actual (e.g., purposefully calculated rather than assumed or estimated) temperature of a semiconductor device and/or an interconnects in the semiconductor ship design. This input is then used to assess at least one temperature-dependent performance parameter of the semiconductor chip design.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Embodiments of the invention generally provide a method and apparatus for retrofitting semiconductor chip performance analysis tools with full-chip thermal analysis capabilities. By providing temperature data that is computed or calculated based on actual chip information instead of estimated temperature data (e.g., based on an assumed uniform temperature), more accurate assessment of temperature-dependent performance parameters such as timing, delay, voltage drops, current flow, power consumption and the like can be achieved. Thus, a semiconductor chip designed in accordance with the present invention will be less prone to failure (e.g., due to under-estimation of temperature) and less likely to waste expensive materials (e.g., due to over-estimation of temperature).

As used herein, the term "semiconductor chip" refers to any type of semiconductor chip, which might employ analog and/or digital design techniques and which might be fabricated in a variety of fabrication methodologies including, but not limited to, complementary metal-oxide semiconductor (CMOS), bipolar complementary metal-oxide semiconductor (BiCMOS), and gallium arsenide (GaAs) methodologies. Furthermore, as used herein, the term "semiconductor device" refers to a potential active heat dissipating device in a semiconductor chip, including, but not limited to, transistors, resistors, capacitors, diodes and inductors. The terms "wire", "interconnect" or "wire interconnect" as used herein refer to any of various means of distributing electrical signals (which may be analog or digital, static or dynamic, logic signals or power/ground signals) from one place to another. "Interconnects" may be on a semiconductor chip itself, used in the packaging of the semiconductor chip, deployed between the semiconductor chip and the packaging, or used in a variety of other ways.

Figure 1:
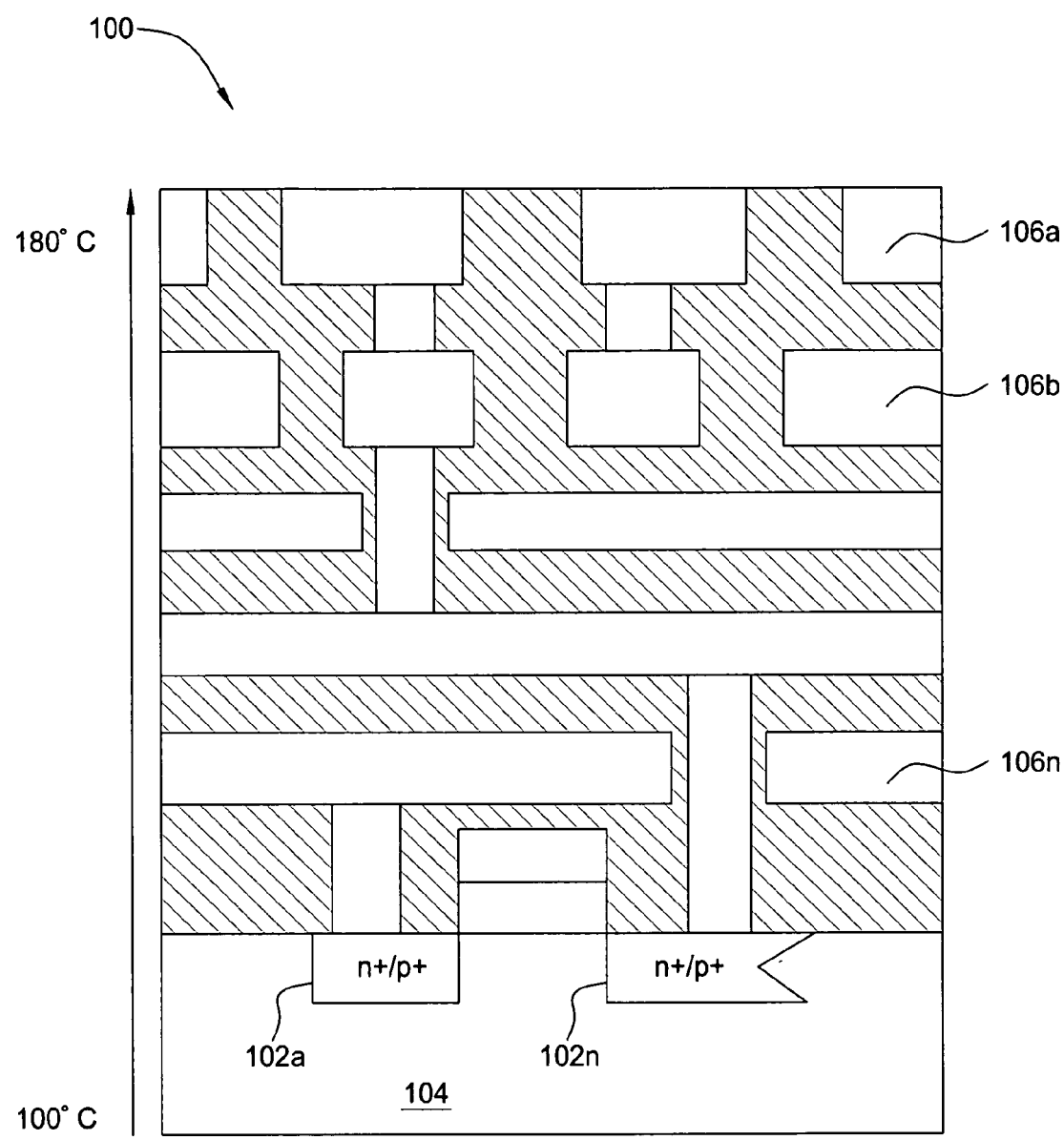
FIG. 1 is a schematic diagram illustrating an exemplary semiconductor chip.
Figure 2:
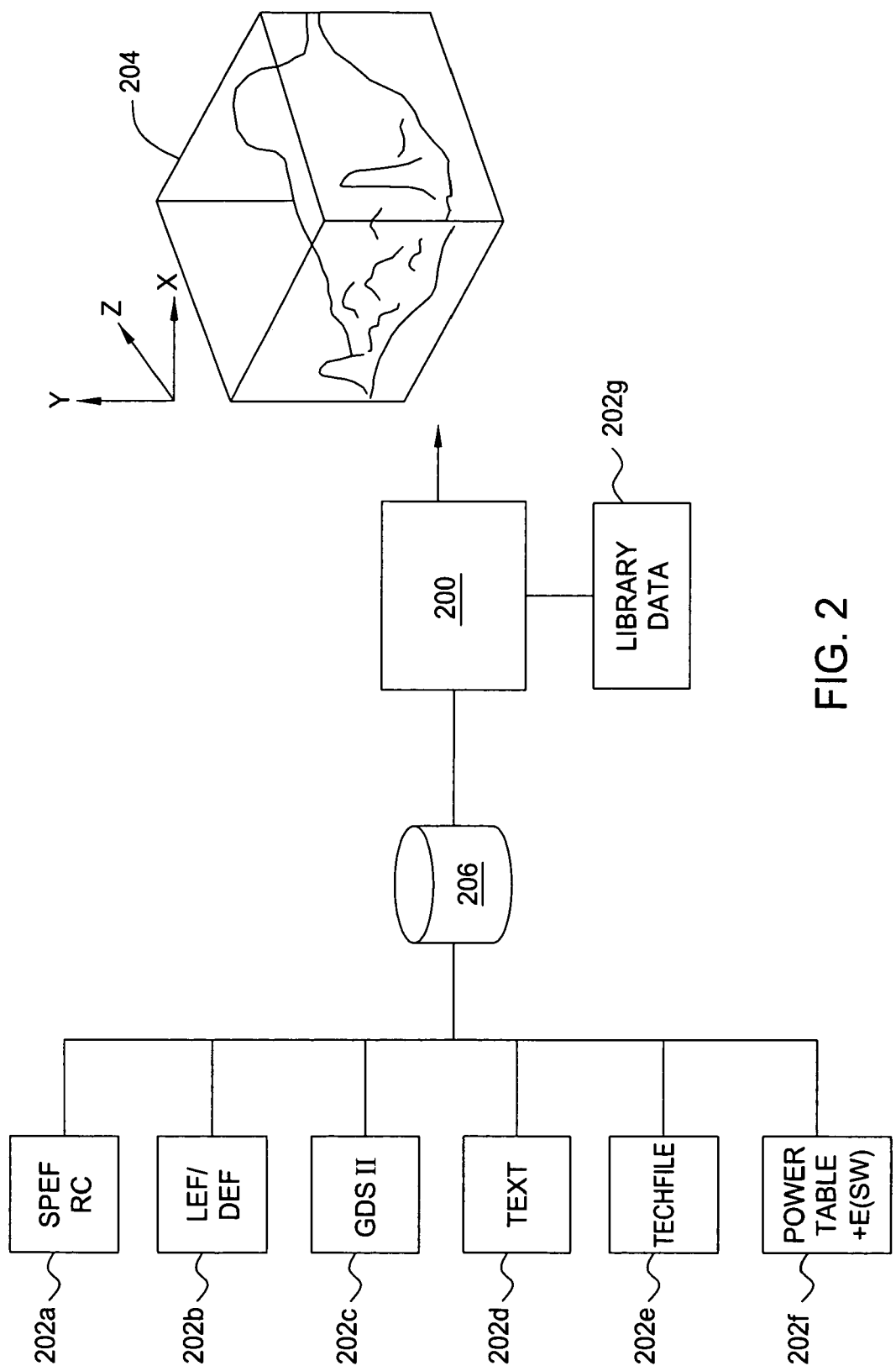
FIG. 2 is a schematic diagram illustrating one implementation of a thermal analysis tool according to the present invention.

FIG. 2 is a schematic diagram illustrating one implementation of a thermal analysis tool 200 according to the present invention. As illustrated, the thermal analysis tool 200 is adapted to receive a plurality of inputs 202a–202g (hereinafter collectively referred to as "inputs 202") and process these inputs 202 to produce a full-chip (e.g., three-dimensional) thermal model 204 of a proposed semiconductor chip design.

In one embodiment, the plurality of inputs 202 includes industry standard design data 202a–202f (e.g., pertaining to the actual chip design or layout under consideration) and library data 202g (e.g., pertaining to the semiconductor devices and interconnects incorporated in the design). In one embodiment, the industry standard design data includes one or more of the following types of data: electrical component extraction data and extracted parasitic data (e.g., embodied in standard parasitic extraction files, or SPEFs, 202a), design representations including layout data (e.g., embodied in Library Exchange Format/Design Exchange Format, or LEF/DEF files 202b, Graphical Design Format II, or GDSII, files 202c and/or text files 202d), manufacturer-specific techfiles 202e describing layer information and package models, user-generated power tables 202f including design data (e.g., including a switching factor, E(sw)). In one embodiment, this industry standard design data 202a–202f is stored in a design database 206 such as an open access database or a proprietary database. In one embodiment, the library data 202g is embodied in a library that is distributed by a semiconductor part manufacturer or a library vendor. In another embodiment, the library incorporating the library data 202g can be built in-house by a user.

In one embodiment, the library data 202g includes transistor and diode models that are used to characterize the transistor resistances ($R_{dv}$) of the driver circuits, e.g., such as models available through Berkeley short-channel Insulated Gate Field Effect Transistor (IGFET) model (BSIM) models used by circuit simulators including Simulation Program with Integrated Circuit Emphasis (SPICE) or HSPICE, commercially available from Synopsys, Inc. of Mountain View, Calif. and Heterogeneous Simulation Interoperability Mechanism (HSIM, commercially available from Nassda Corporation of Santa Clara, Calif.), all developed at the University of California at Berkeley.

As mentioned above, the plurality of inputs 202 are provided to the thermal analysis tool 200, which processes the data in order to produce a full-chip thermal model 204 of a proposed semiconductor chip design. In one embodiment, the full-chip thermal model is a three-dimensional thermal model.

Thus, as described above, embodiments of the present invention rely on library data representing the electrical properties of a semiconductor chip design (e.g., the resistance and capacitance at various points) and the manners in which these properties may vary with respect to each other and with respect to other phenomena (e.g., temperature or fabrication variations). Those skilled in the art will appreciate that these electrical properties may be specified or calculated in any number of ways, including, but not limited to, table-driven lookups, formulas based on physical dimensions, and the like.

Figure 3:
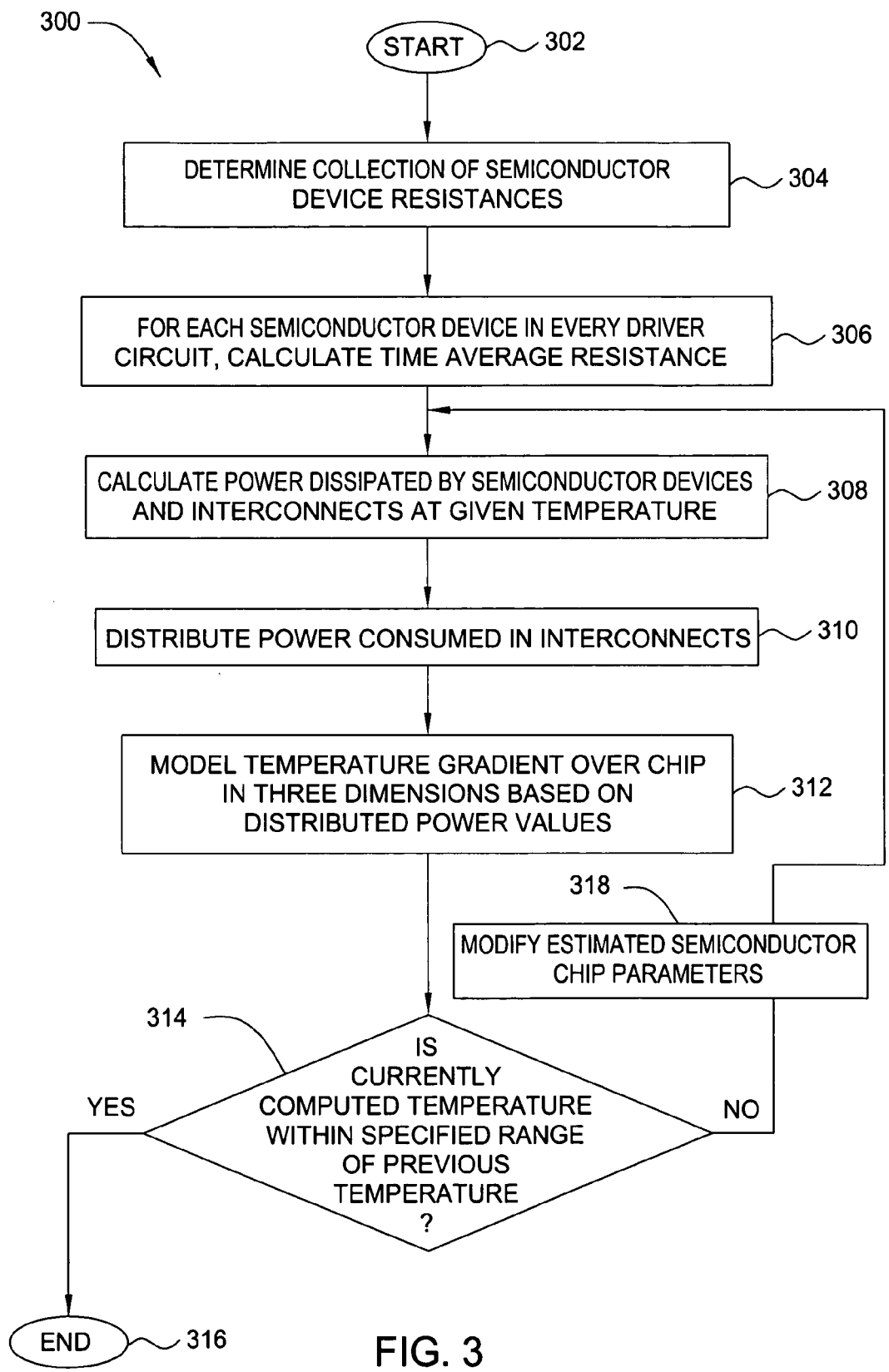
FIG. 3 is a flow diagram illustrating one embodiment of a method for performing three-dimensional thermal analysis of a semiconductor chip design according to the present invention.

FIG. 3 is a flow diagram illustrating one embodiment of a method 300 for performing full-chip thermal analysis of a semiconductor chip design according to the present invention. The method 300 may be implemented, for example, in the thermal analysis tool 200 illustrated in FIG. 2. In one embodiment, the method 300 relies on the computation of power dissipated by various semiconductor devices of the semiconductor chip design. As will be apparent from the following discussion, this power computation may be performed in any number of ways, including, but not limited to, table-driven lookups, computations based on electrical properties, circuit simulations, and the like. Moreover, those skilled in the art will appreciate that although the following description discusses the effects of resistance on power dissipation, power dissipation computations could be based on any number of other electrical properties or parameters, including, but not limited to, capacitance, inductance and the like. Moreover, the computations could be static or dynamic.

The method 300 is initialized at step 302 and proceeds to step 304, where the method 300 determines the collection of semiconductor devices (e.g., transistor, resistors, capacitors, diodes inductors and the like) and their resistances. In one embodiment, the method 300 determines this information by reading one or more of the chip layout data (e.g., in GDS II, DEF and/or text format), layer and package model data (e.g., from one or more techfiles), and initial power and power versus temperature data for the semiconductor devices (e.g., from the library data). In one embodiment, initial power values and power values as a function of temperature may be recorded within a common power table for acceptable operating ranges for the driver circuits within the chip design. The driver circuits may be at semiconductor device level or at cell level, where cell level circuits represent an abstraction of interconnected semiconductor devices making up a known function.

In step 306, the method 300 uses the information collected in step 304 to calculate the time average resistance values for every semiconductor device in every driver circuit of the chip design, as well as for every diode junction. These time-average resistance values relate to changes in semiconductor device dimensions (e.g., such as using higher power transistors in place of lower power transistors in a chip design). In one embodiment, the time average resistance value, $R_{average}$ for a semiconductor device is calculated as:

$$R_{average} = \frac{\int_0^{t_r} Rdv(t)dt}{t_r} \quad \text{(EQN. 1)}$$

where $t_r$ is the output transition time of the driver circuit under consideration, e.g., as specified by the library data.

Figure 4:
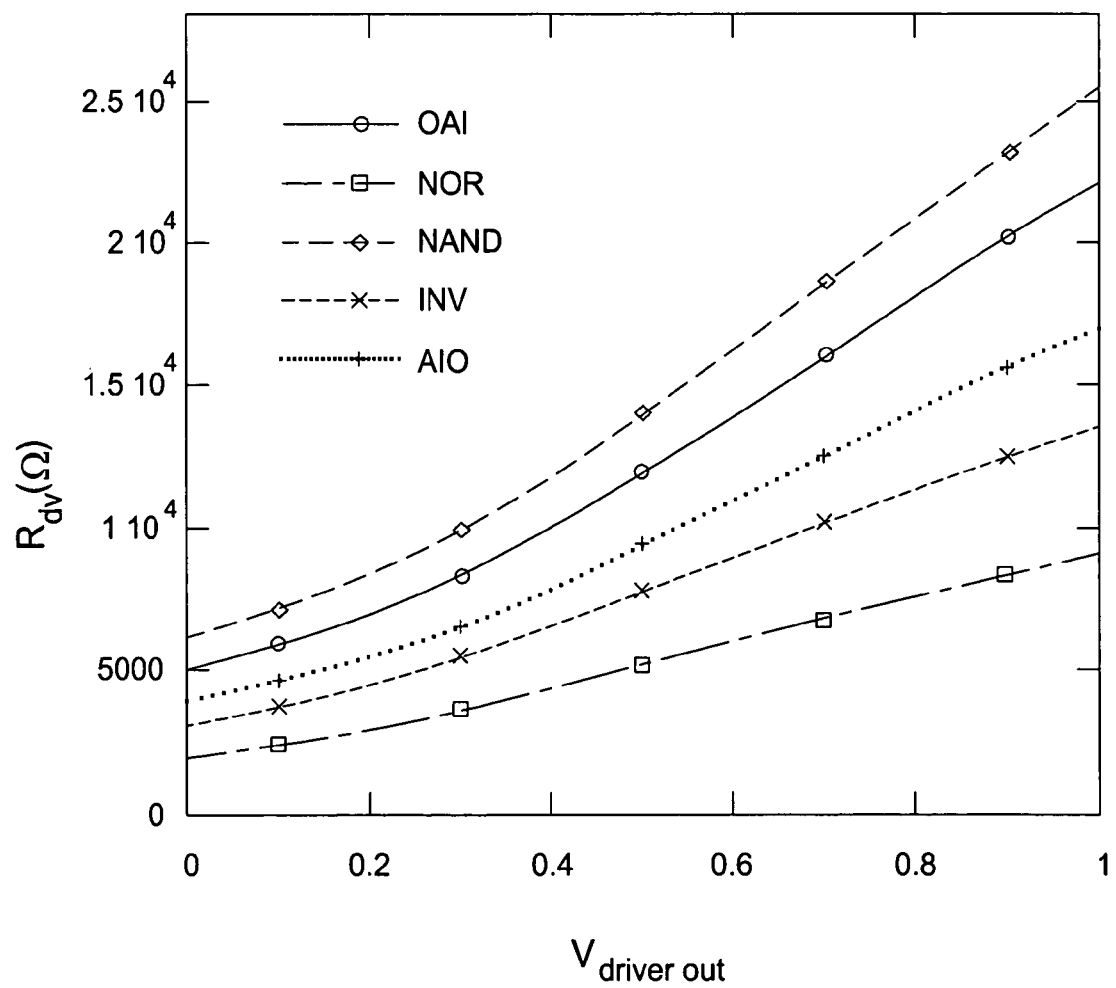
FIG. 4 is a graph illustrating the change in value of transistor resistance for an exemplary negative channel metal oxide semiconductor as a function of the output transition voltage.

FIG. 4 is a graph illustrating the change in value of transistor resistance, $R_{dv}$ for an exemplary negative channel metal oxide semiconductor (nMOS) as a function of the output transition voltage, $V_{driver\_out}$. As illustrated, the power dissipated by a transistor varies during switching. This is also true for the power dissipated in other semiconductor devices and in the interconnects coupled to the semiconductor devices on the chip.

Referring back to FIG. 3, in step 308, the method 300 calculates the power dissipated by the semiconductor devices and interconnects at a given temperature for the design under consideration. In one embodiment of step 308, e.g., where a steady-state analysis of the chip design is being performed, the interdependence of temperature and average power is captured through pre-characterized parameters of the semiconductor devices and interconnects. In one embodiment, the power dissipated by a semiconductor device (in this exemplary case, a transistor), $P_{transistor}$, is calculated as:

$$P_{transistor} = (V_d)^2 / R_{average} \quad \text{(EQN. 2)}$$

where $V_d$ is the power supply voltage supplied to the transistor. This voltage, $V_d$, is less than the actual power supply voltage, $V_{dd}$, as the current drawn by the transistors and flowing through the interconnects that connect the transistors to a power supply causes a voltage drop. In another embodiment, the power supply voltage to the transistor $V_d$ could be divided by the maximum or minimum resistance value, $R_{max}$ or $R_{min}$ in order to calculate the power dissipated in the transistor. In one embodiment, a decision as to whether to use an average, minimum or maximum resistance value to calculate $P_{transistor}$ is based at least in part on whether additional conditions, such as the operation of the circuit, are to be evaluated.

While equations for calculating the power dissipation of transistors have been provided herein by way of example, those skilled in the art will appreciate that various methods of calculating power dissipation for other semiconductor devices, such as resistors, capacitors and diodes, are known in the art. For example, equations for calculating the power dissipation of a resistor are discussed in the Proceedings of the Fourth International Symposium on Quality Electronic Design (ISQED 2003), 24–26 Mar. 2003, San Jose, Calif.

In one embodiment, the power dissipated by the interconnects (e.g., power and signal lines), $P_{interconnect}$ is calculated as:

$$P_{interconnect} = P - P_{transistor} \quad \text{(EQN. 3)}$$

where P is the average electrical power dissipated per clock cycle by a digital circuit (e.g., the chip design under consideration; for the full chip, the total P is the sum of the power dissipated by each circuit in the chip) and is available from the library data 202g. In the power lines, power is typically dissipated as Joule heating, where the dissipated power $P_{dissipated}$ may be calculated as:

$$P_{dissipated} = I_p^2 R_{power} \quad \text{(EQN. 4)}$$

where $I_p$ is the current through the power lines and $R_{power}$ is the resistance of the power bus. The value of Ip may be calculated by commercially available tools, such as Voltage Storm, available from Cadence Design Systems, Inc. of San Jose, Calif.

Typically, the power drawn by a switching transistor may be calculated as:

$$P = C_{load} V_{dd} E(sw)(fclk) \quad \text{(EQN. 5)}$$

where $C_{load}$ is the output capacitance as seen by the circuit, E(sw) is the switching activity as defined by the average number of output transitions per clock period, and fclk is the clock frequency. The switching factor or acrivity, E(sw), is used for evaluating the power table for the initial state of the design. $C_{load}$ may be calculated by parasitic extraction tools, and values for fclk and $V_{dd}$ are typically specified for a given design. In general, half of the power, P, is stored in the capacitance and the other half is dissipated in the transistors and interconnects (e.g., the power and signal lines). Those skilled in the art will appreciate that since $R_{average}$ varies with the transition time of the circuits, and as the switching activity changes for different modes of operation, E(sw) will also change, thereby changing the value of P and the distribution of the amounts of power dissipated in the transistors (e.g., see Equation 2) and interconnects. This will, in turn, change the heat fields and corresponding temperatures within the chip.

In another embodiment of step 308, a transient analysis is performed, wherein the interdependence of temperature and average power in the semiconductor devices and interconnects is based on instantaneous values of power. In this case, power dissipated values are calculated by dynamically simulating the circuit embodied in the chip design under consideration. For example, the circuit may be simulated using any commercially available circuit simulator, such as HSPICE or HSIM, discussed above, or SPECTRE, commercially available from Cadence Design Systems. In one embodiment, the circuit is simulated by solving for values of electrical attributes (e.g., current and voltages) at various points in time. In the case of transient thermal analysis, the thermal analysis system (e.g., thermal analysis tool 200 of FIG. 2) drives the circuit simulator to calculate power at discrete points whenever there is a sufficient change in the temperature of the circuit. In one embodiment, the sufficiency of a temperature change for these purposes is determined by a predefined threshold.

In step 310, the method 300 distributes the power consumed in each of the interconnects. In one embodiment, power is distributed based on the resistance of the wires used in the interconnects, which is defined by the type, thickness and height of the wires used in the interconnects. In one embodiment, the resistance, $R_{interconnect}$, of an interconnect segment is calculated as:

$$R_{interconnect} = \frac{\rho L}{wt} \qquad \text{(EQN. 6)}$$

where L is the length of the interconnect segment, w is the width of the segment, t is the thickness of the segment, and ρ is a resistivity constant dependent upon the type of wire used. The resistivity constant, ρ, may be found in tables included in any number of integrated circuits textbooks, including Rabaey et al., *Digital Integrated Circuits*, Second Edition, Prentice Hall Electronic and VLSI Series, 2002.

In step 312, the method 300 uses the power dissipation and distribution information calculated in steps 306–310 to model a full-chip (e.g., three-dimensional) temperature gradient over the chip design under consideration. In one embodiment, a full-chip temperature gradient is modeled by adaptively partitioning the volumes of steep temperature gradients over the chip design. In one embodiment, partitioning is done in three dimensions; however, in other embodiments, partitioning may be done in one or two dimensions as well (for example, vertical partitioning may be explicitly considered in how the temperature is modeled). In one embodiment, "steep" temperature gradients are those portions of the overall temperature gradient that are steep relative to other regions of the overall temperature gradient. In one embodiment, techfile data (e.g., pertaining to the dimensions and properties of the chip design layers) and power density data are used to partition the chip design. Power density data is typically contained within the power table provided for a particular state of operation of a chip design. The temperatures in each partition are then determined and annotated accordingly in the three-dimensional model.

In step 314, the method 300 determines whether the currently computed temperature for the chip design falls within a previously specified range. If the method 300 concludes that the currently computed temperature does not fall within this range, the method 300 proceeds to step 318 and modifies the estimated chip parameters (e.g., by changing the resistances of the semiconductor devices and interconnects, resizing the semiconductor devices and interconnect wires, etc.). The method 300 then returns to step 308 and proceeds as discussed above.

Alternatively, if the method 300 determines that the currently computed temperature does fall within the specified range, the method 300 proceeds to step 316 and terminates. Thus, steps of the method 300 may be repeated in an iterative manner until a steady state value is reached, within a specified tolerance. In one embodiment, iteration of these steps may depend on the particular implementation of the method 300. In further embodiments, iteration could include convergence to an absolute value, convergence to a relative value, or the passing of a fixed number or iterations or a fixed amount of time.

Thus, the method 300 employs industry standard design, package and heat sink data in order to produce a more complete and more accurate profile of the temperature gradient created by a semiconductor chip design. By accounting for the distribution of power dissipated in the semiconductor devices and in the interconnects, rather than simply characterizing dissipated power as the power dissipated in the active semiconductor devices (which does not consider simultaneous changes in the electrothermal properties of the semiconductor devices and interconnects), more accurate, full-chip thermal profiling can be achieved.

Chip designers may use the full-chip data produced by the method 300 to design more robust semiconductor chips for particular applications. For example, if the full-chip temperature gradient produced by one iteration of the method 300 does not illustrate acceptable results for a semiconductor chip design, a chip designer may go back and modify the chip design (e.g., by changing the resistances of the semiconductor devices and interconnects, resizing the semiconductor devices and interconnect wires, etc.) in an attempt to achieve more desirable results. The method 300 may then be applied to the modified design to assess the resultant temperature gradient. Those skilled in the art will appreciate that while the method 300 illustrates a series of steps, the present invention is not limited to the particular sequence illustrated, and thus FIG. 3 should be considered only as one exemplary embodiment of the present invention.

In some embodiments, existing performance analysis tools for assessing semiconductor chip designs (e.g., tools that assume a uniform temperature over the semiconductor chip) may be retrofitted or adapted to benefit from the present invention. As will be discussed in greater detail below, the methods and apparatuses of the present invention may be implemented in conjunction with one or more existing performance analysis tools in order to improve assessment of semiconductor chip designs by providing actual temperature data for assessment of temperature-dependent performance parameters (e.g., timing, delay, voltage drops, current flow, power consumption and the like).

Figure 5:
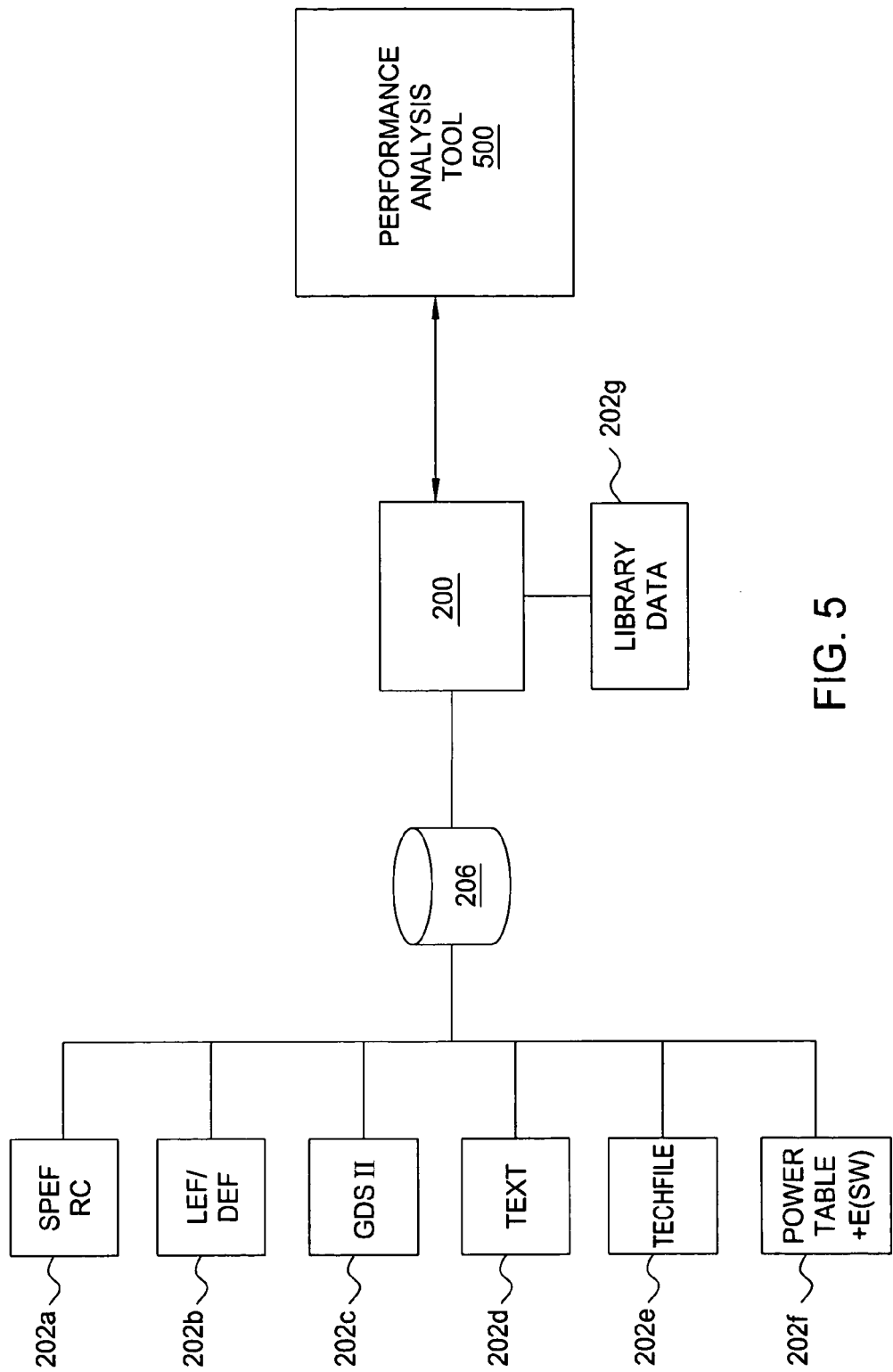
FIG. 5 is a schematic diagram illustrating one implementation of the thermal analysis tool of FIGS. 2–4 in conjunction with a conventional performance analysis tool, according to the present invention.

FIG. 5 is a schematic diagram illustrating one implementation of the thermal analysis tool 200 in conjunction with a conventional performance analysis tool 500, according to the present invention. As previously discussed, the thermal analysis tool 200 is adapted to receive a plurality of inputs 202 (including industry standard design data 202a–202f and library data 202g) and process these inputs 202 to produce a full-chip thermal model of a proposed semiconductor chip design.

Moreover, the thermal analysis tool 200 is in bi-directional communication with the performance analysis tool 500. As will be discussed in greater detail below, the thermal analysis tool is adapted modify various design data (including the resistances and delays of the semiconductor devices and the interconnects) and provide this modified data to the performance analysis tool 500. In some cases, modification of the design data is aided by data (including capacitive load and signal waveform changes) that is provided to the thermal analysis tool 200 by the performance analysis tool 500. Thus, the effects that the different temperatures of the individual semiconductor devices and interconnects have on the signals within the semiconductor chip can be properly accounted for in the performance analysis.

Moreover, although FIG. 5 illustrates only a single performance analysis tool 500 interacting with the thermal analysis tool 200, those skilled in the art will appreciate that multiple performance analysis tools may interact with the thermal analysis tool 200 to evaluate a semiconductor chip design. For example, the thermal analysis tool may interact with SPICE to get delays, and also interact with a timing tool in accordance with the given delays from SPICE.

Alternatively, the full-chip analysis capabilities of the thermal analysis tool 200 may be integrated with the capabilities of the performance analysis tool(s) 500 in a single tool for performing performance analysis based on computed, full-chip temperature data.

Figure 6:
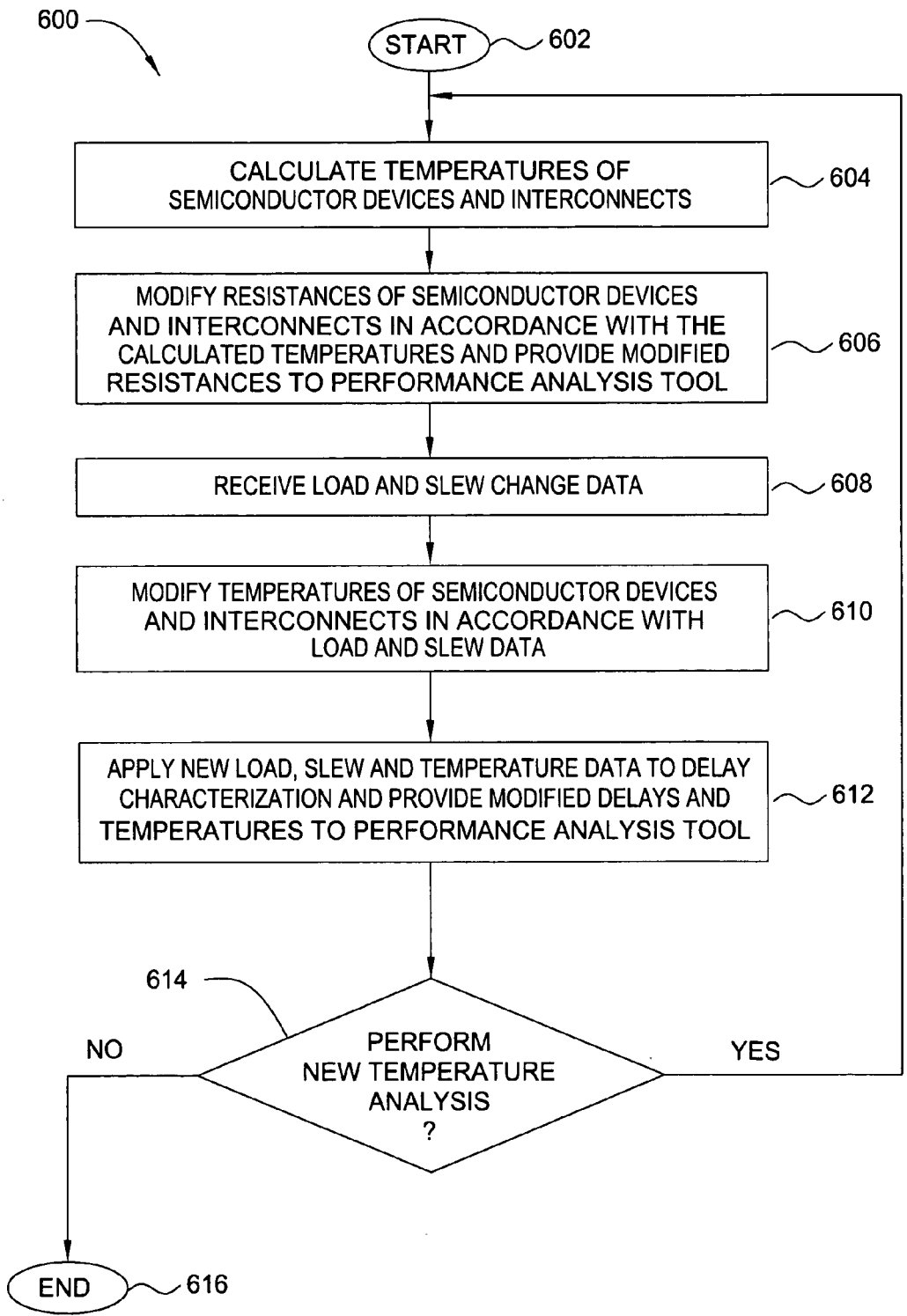
FIG. 6 is a flow diagram illustrating one embodiment of a method for performance analysis using the thermal analysis tool, according to the present invention.

FIG. 6 is a flow diagram illustrating one embodiment of a method 600 for performance analysis using the thermal analysis tool 200, according to the present invention. The method 600 may be executed at, for example, the thermal analysis tool 200.

The method 600 is initialized at step 602 and proceeds to step 604, where the method 600 calculates the temperatures of the semiconductor devices and interconnects in the semiconductor chip design. In one embodiment, this calculation is performed in accordance with the method 300 illustrated in FIG. 3. In another embodiment, this calculation may be performed in accordance with any known method for measuring actual, full-chip temperatures over a semiconductor chip design.

Once the temperatures of the semiconductor devices and the interconnects have been calculated, the method 600 proceeds to step 606 and modifies the resistances of the semiconductor devices and the interconnects in accordance with the calculated temperatures. The method 600 then provides these modified resistances to the performance analysis tool (e.g., performance analysis tool 500) for delay calculation (e.g., based on the modified resistances).

In step 608, the method 600 receives data from the performance analysis tool relating to changes in the capacitive load ("load") and signal waveforms ("slew"). These changes in load and slew are the result of the delay calculation performed by the performance analysis tool using the modified semiconductor device and interconnect resistances.

The method 600 then proceeds to step 610 and modifies the temperatures of the semiconductor devices and interconnects in accordance with the load and slew data received in step 608. Then, the method 600 proceeds to step 612 and applies the new load and slew data, as well as the modified temperatures of the semiconductor devices and interconnects, to a delay characterization. In one embodiment, the method 600 uses the new load and slew data to look up the corresponding delays in the library data (e.g., library data 202g). The method 600 then provides this modified delay and temperature data to the performance analysis tool.

In step 614, the method 600 inquires if a new temperature analysis should be performed. For example, a new temperature analysis may need to be performed if there has been a change in the power consumed by the semiconductor chip design under analysis (e.g., due to the semiconductor chip design performing a different set of operations or going into a different state than the state the semiconductor chip design is presently in). In one embodiment, this determination is made in response to a request or a prompt from the performance analysis tool. If the method 600 determines that a new temperature analysis should be performed, the method 600 returns to step 604 and proceeds as described above. Alternatively, if the method 600 determines that a new temperature analysis should not be performed, the method 600 terminates in step 616.

Thus, the method 600 enables a conventional performance analysis tool for assessing semiconductor chip designs to be retrofitted or adapted with the capability to account for actual temperatures within the semiconductor chip. By providing computed temperature data instead of estimated temperature data (e.g., based on an assumed—and usually erroneous—uniform temperature), more accurate assessment of temperature-dependent performance parameters such as timing, delay, voltage drops, current flow, power consumption and the like can be achieved. Thus, a semiconductor chip designed in accordance with the method 600 will be less prone to failure (e.g., due to under-estimation of temperature) and less likely to waste expensive materials (e.g., due to over-estimation of temperature).

Those skilled in the art will appreciate that, while the method 600 has been described in terms of assessing timing and delay based on computed temperatures, the method 600 is applicable to assessments of other performance parameters as well.

Figure 7:
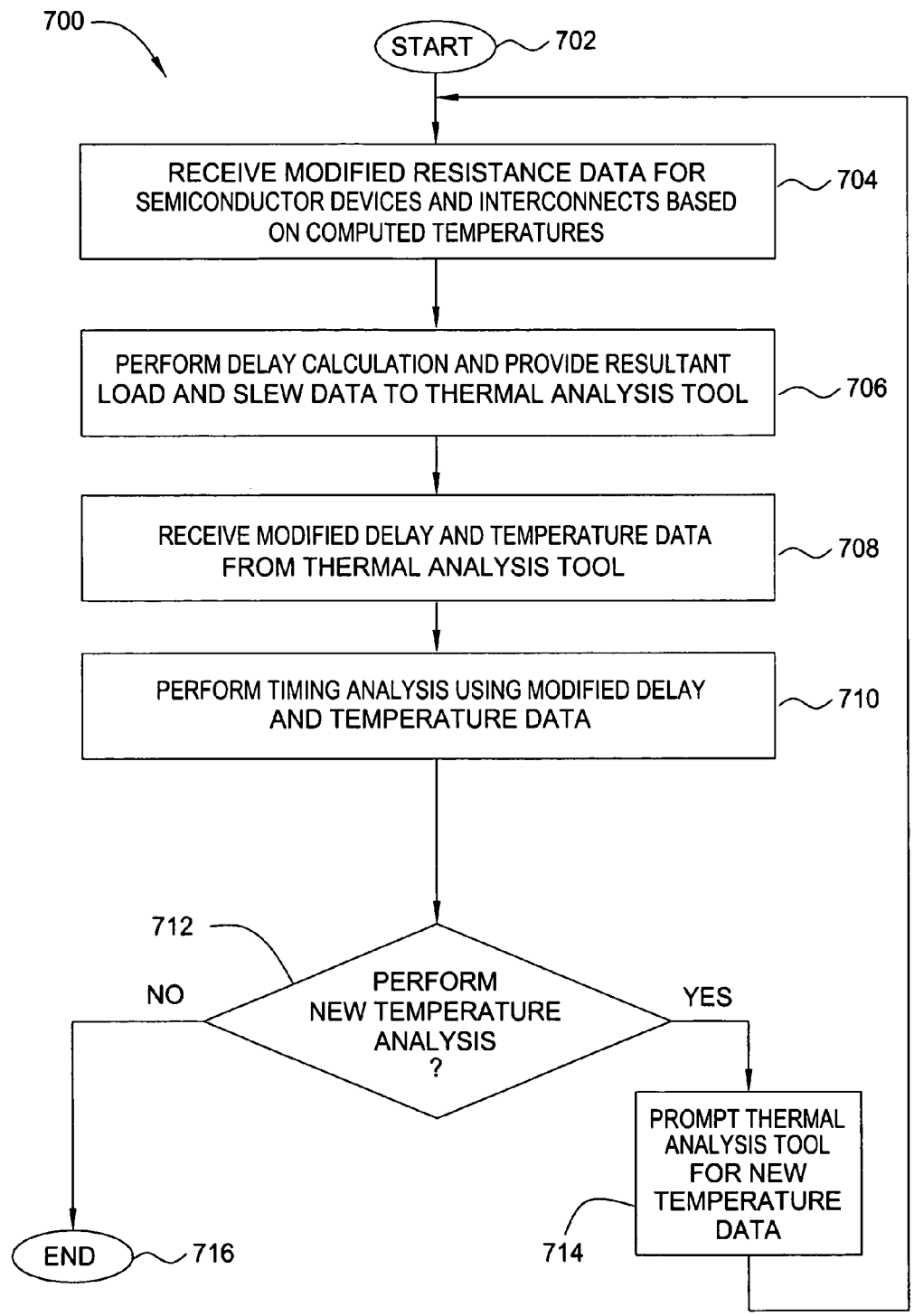
FIG. 7 is a flow diagram illustrating one embodiment of a method for performance analysis using actual temperature data, according to the present invention.

FIG. 7 is a flow diagram illustrating one embodiment of a method 700 for performance analysis using computed temperature data (e.g., received from the thermal analysis tool 200), according to the present invention. The method 700 may be executed at, for example, the performance analysis tool 500.

The method 700 is initialized at step 702 and proceeds to step 704, where the method 700 receives modified resistance data for the semiconductor devices and interconnects in the semiconductor chip design. This modified resistance data is modified in relation to original resistance values assigned to the semiconductor devices and interconnects by the performance analysis tool. The modified resistances are based on computed temperatures within the semiconductor chip design, e.g., computed by a full-chip thermal analysis tool such as the thermal analysis tool 200.

In step 706, the method 700 performs a delay calculation using the modified resistances received in step 704. This delay calculation results in changes to original load and slew values, which the method 700 provides to the thermal analysis tool for further processing.

In step 708, the method 700 receives modified delay and temperature data from the thermal analysis tool, e.g., in response to the load and slew data sent in step 706. The method 700 then proceeds to step 710 and performs a timing analysis using the modified delay and temperature data. In this manner, the timing analysis is now "temperature aware" in the sense that it is performed using computed temperature data instead of an assumed uniform value for temperate. In one embodiment, the nature of the modified delay and temperature data received from the thermal analysis tool will guide the selection of specific computation methods (e.g., direct solvers, multi-grid solvers, finite element solvers, integral method-based solvers, analytical solvers and the like) implemented for the timing analysis. For example, the size of the problem to be solved may dictate the selection of a computation method. A direct solver may be more accurate than other computation methods for solving relatively small problems; however, an iterative, conjugate-gradient or multi-grid solver is typically capable of handling larger problems than is a direct solver.

The method 700 then proceeds to step 712 and inquires if a new temperature analysis should be performed. If the method 700 determines that a new temperature analysis should be performed, the method 700 proceeds to step 714 and prompts the thermal analysis tool for new temperature data. The method 700 then returns to step 704 and proceeds as described above using the new temperature data provided by the thermal analysis tool in response to the prompt. Alternatively, if the method 700 determines in step 712 that a new temperature analysis should not be performed, the method 700 terminates in step 716.

Figure 8:
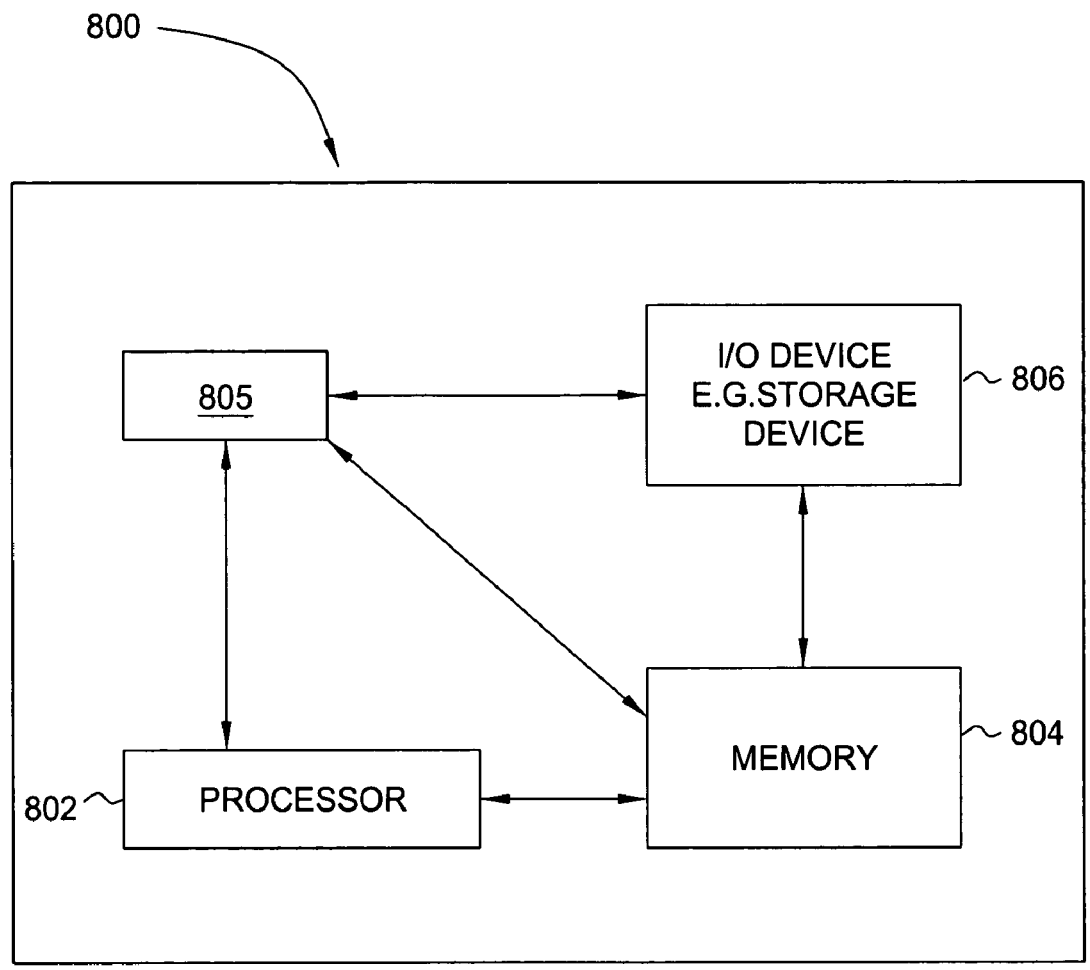
FIG. 8 is a high level block diagram of the present dynamic performance analysis tool that is implemented using a general purpose computing device.

FIG. 8 is a high level block diagram of the present dynamic performance analysis tool that is implemented using a general purpose computing device 800. In one embodiment, a general purpose computing device 800 comprises a processor 802, a memory 804, a performance analysis module 805 and various input/output (I/O) devices 806 such as a display, a keyboard, a mouse, a modem, a network connection and the like. In one embodiment, at least one I/O device is a storage device (e.g., a disk drive, an optical disk drive, a floppy disk drive). It should be understood that the performance analysis module 805 can be implemented as a physical device or subsystem that is coupled to a processor through a communication channel.

Alternatively, the performance analysis module 805 can be represented by one or more software applications (or even a combination of software and hardware, e.g., using Application Specific Integrated Circuits (ASIC)), where the software is loaded from a storage medium (e.g., I/O devices 806) and operated by the processor 802 in the memory 804 of the general purpose computing device 800. Additionally, the software may run in a distributed or partitioned fashion on two or more computing devices similar to the general purpose computing device 800. Thus, in one embodiment, the performance analysis module 805 for performance analysis of semiconductor chip designs using actual temperature data described herein with reference to the preceding figures can be stored on a computer readable medium or carrier (e.g., RAM, magnetic or optical drive or diskette, and the like).

Thus, the present invention represents a significant advancement in the field of semiconductor chip design. One embodiment of the invention provides an inventive method for providing computed, full-chip temperature data to conventional performance analysis tools, thereby improving the accuracy of the assessment of temperature-dependent performance parameters. Thus, a semiconductor chip designed in accordance with the present invention will be less prone to failure (e.g., due to under-estimation of temperature) and less likely to waste expensive materials (e.g., due to over-estimation of temperature).

While the foregoing is directed to embodiments of the invention, other and further embodiments of the invention may be devised without departing from the basic scope thereof, and the scope thereof is determined by the claims that follow.

What is claimed is:

1. A method for performing performance analysis of a semiconductor chip design, said semiconductor chip design including a plurality of embedded semiconductor devices and a plurality of embedded interconnects connecting said plurality of semiconductor devices, the method comprising:

computing a temperature for at least one of said plurality of embedded semiconductor devices and said plurality of embedded interconnects, said computed temperature being computed in accordance with a three-dimensional full-chip thermal model that is adaptively partitioned in response to volumes of steep thermal gradients over the semiconductor chip design and that depicts computed temperatures for all semiconductor devices and all interconnects in said semiconductor chip design;

calculating a resistance of said at least one of said plurality of semiconductor devices and said plurality of interconnects, in accordance with the computed temperature;

providing at least said resistance to at least one performance analysis tool for assessment of at least one performance parameter of said semiconductor chip design in accordance with said resistance;

receiving a first input from said at least one performance analysis tool as a result of said assessment, said first input comprising at least one of: modified capacitive load data and modified signal waveform data, where said modified capacitive load data and said modified signal waveform data relate to at least one of said plurality of embedded semiconductor devices and said plurality of embedded interconnects;

calculating a modified temperature for at least one of said plurality of embedded semiconductor devices and said plurality of embedded interconnects in accordance with the first input; and determining a delay that corresponds to the first input.

2. The method of claim 1, wherein said resistance is a resistance value revised in accordance with the computed temperature.

3. The method of claim 1, wherein said modified first input is the result of a delay calculation performed by said at least one performance analysis tool in accordance with said resistance.

4. The method of claim 1, further comprising:

providing at least one of said modified temperature and said delay to said at least one performance analysis tool for use in a timing analysis.

5. The method of claim 1, wherein said at least one performance parameter is temperature-dependent.

6. The method of claim 5, wherein said at least one performance parameter is at least one of: timing, delay, voltage drop, current flow and power consumption.

7. A computer readable medium containing an executable program for performing performance analysis of a semiconductor chip design, said semiconductor chip design including a plurality of embedded semiconductor devices and a plurality of embedded interconnects connecting said plurality of semiconductor devices, where the program performs the steps of computing a temperature for at least one of said plurality of embedded semiconductor devices and said plurality of embedded interconnects, said computed temperature being computed in accordance with a three-dimensional full-chip thermal model that is adaptively partitioned in response to volumes of steep thermal gradients over the semiconductor chip design and that depicts computed temperatures for all semiconductor devices and all interconnects in said semiconductor chip design;

calculating a resistance of said at least one of said plurality of semiconductor devices and said plurality of interconnects, in accordance with the computed temperature;

providing at least said resistance to at least one performance analysis tool for assessment of at least one performance parameter of said semiconductor chip design in accordance with said resistance;

receiving a first input from said at least one performance analysis tool as a result of said assessment, said first input comprising at least one of: modified capacitive load data and modified signal waveform data, where said modified capacitive load data and said modified signal waveform data relate to at least one of said plurality of embedded semiconductor devices and said plurality of embedded interconnects; and calculating a modified temperature for at least one of said plurality of embedded semiconductor devices and said plurality of embedded interconnects in accordance with the first input; and determining a delay that corresponds to the first input.

8. The computer readable medium of claim 7, wherein said resistance is a resistance value revised in accordance with the computed temperature.

9. The computer readable medium of claim 7, wherein said first input is the result of a delay calculation performed by said at least one performance analysis tool in accordance with said resistance.

10. The computer readable medium of claim 7, further comprising:
   providing at least one of said modified temperature and said delay to said at least one performance analysis tool for use in a timing analysis.

11. The computer readable medium of claim 7, wherein said at least one performance parameter is temperature-dependent.

12. The computer readable medium of claim 11, wherein said at least one performance parameter is at least one of: timing, delay, voltage drop, current flow and power consumption.

13. Apparatus for performing performance analysis of a semiconductor chip design, said semiconductor chip design including a plurality of embedded semiconductor devices and a plurality of embedded interconnects connecting said plurality of semiconductor devices, the apparatus comprising:
   means for computing a temperature for at least one of said plurality of embedded semiconductor devices and said plurality of embedded interconnects, said computed temperature being computed in accordance with a three-dimensional full-chip thermal model that is adaptively partitioned in response to volumes of steep thermal gradients over the semiconductor chip design and that depicts computed temperatures for all semiconductor devices and all interconnects in said semiconductor chip design;
   means for calculating a resistance of said at least one of said plurality of semiconductor devices and said plurality of interconnects, in accordance with the computed temperature;
   means for providing at least said resistance to at least one performance analysis tool for assessment of at least one performance parameter of said semiconductor chip design in accordance with said resistance.
   means for receiving a first input from said at least one performance analysis tool as a result of said assessment, said first input comprising at least one of: modified capacitive load data and modified signal waveform data, where said modified capacitive load data and said modified signal waveform data relate to at least one of said plurality of embedded semiconductor devices and said plurality of embedded interconnects; and
   means for calculating a modified temperature for at least one of said plurality of semiconductor devices and said plurality of embedded interconnects in accordance with the first input; and
   determining a delay that corresponds to the first input.

14. A method for performing performance analysis of a semiconductor chip design, said semiconductor chip design including a plurality of embedded semiconductor devices and a plurality of embedded interconnects connecting said plurality of semiconductor devices, the method comprising:
   calculating a temperature of at least one of said plurality of embedded semiconductor devices and said plurality of embedded interconnects, in accordance with a three-dimensional full-chip thermal model that is adaptively partitioned in response to volumes of steep thermal gradients over the semiconductor chip design and that depicts computed temperatures for all semiconductor devices and all interconnects in said semiconductor chip design;
   calculating at least one revised resistance value of said at least one of said plurality of semiconductor devices and said plurality of interconnects, in accordance with said calculated temperature receiving at least one of: modified capacitive load data, modified signal waveform data and modified delay data relating to said at least one of said plurality of semiconductor devices and said plurality of interconnects, where said modified capacitive load data and said modified signal waveform data relate to at least one of said plurality of semiconductor devices and said plurality of interconnects; and
   performing a delay calculation in accordance with said at least one of the modified capacitive load data, the modified signal waveform data and the modified delay data in order to assess at least one temperature-dependent performance parameter of said semiconductor chip design in accordance with said calculated temperature.

15. The method of claim 14, further comprising:
   modifying delay data relating to said at least one of said plurality of semiconductor devices and said plurality of interconnects, in accordance with said modified capacitive load data and said modified signal waveform data; and
   performing a timing analysis in accordance with said modified delay data.

16. The method of claim 14, wherein said at least one performance parameter is at least one of: timing, delay, voltage drop, current flow and power consumption.

* * * * *